United States Patent Office 3,156,491
Patented Nov. 10, 1964

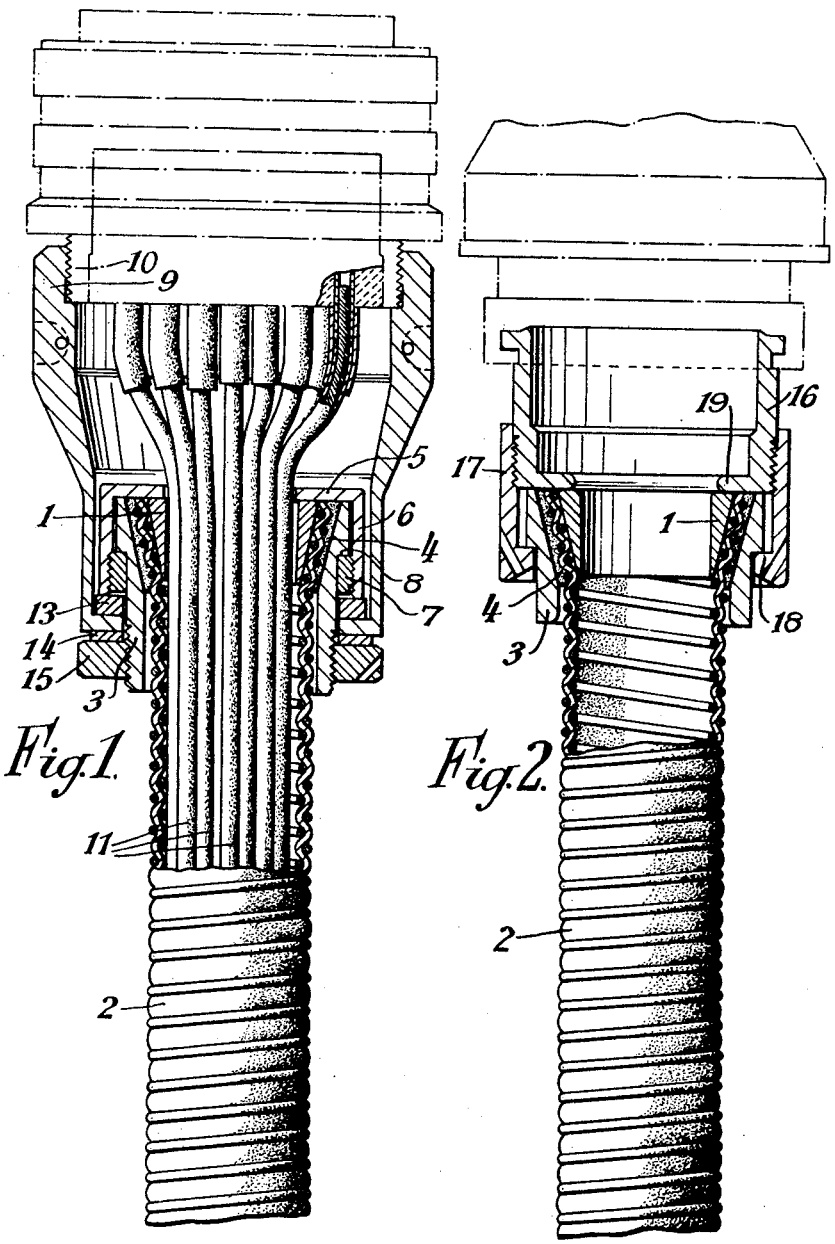

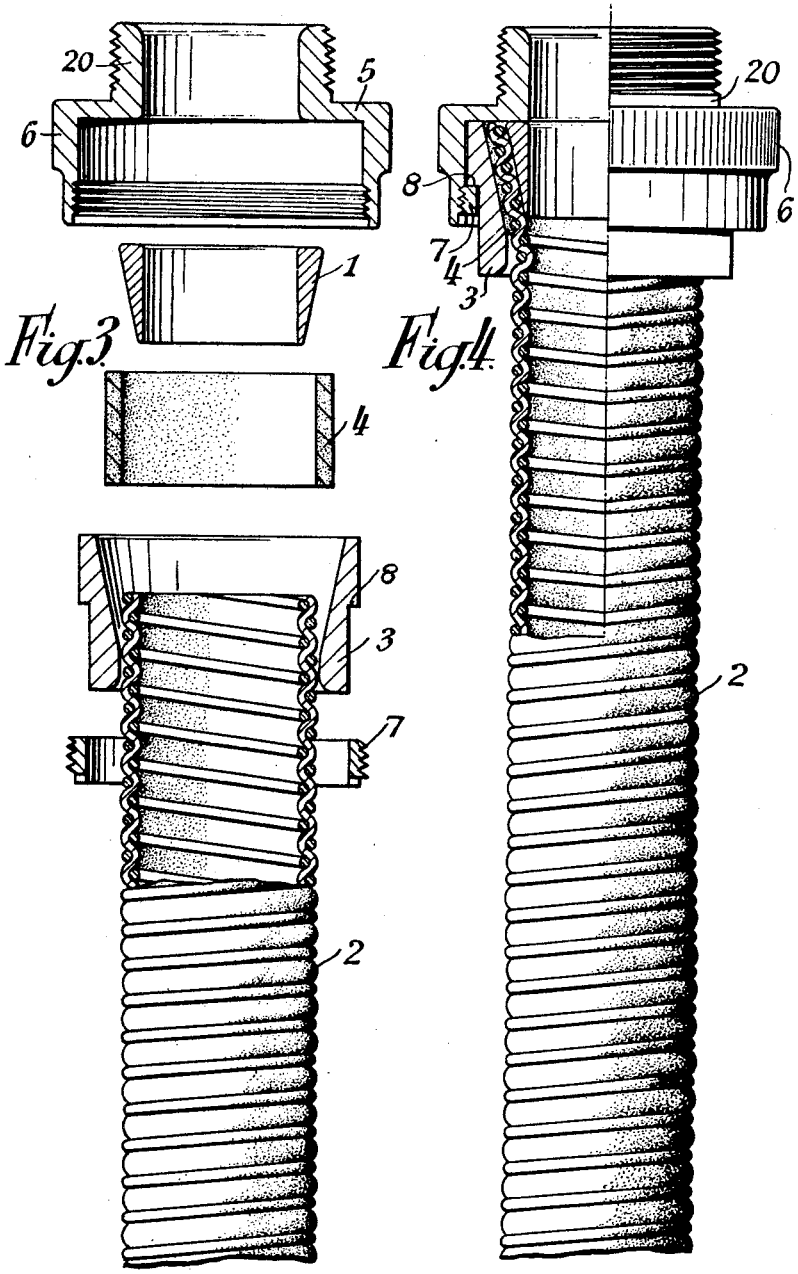

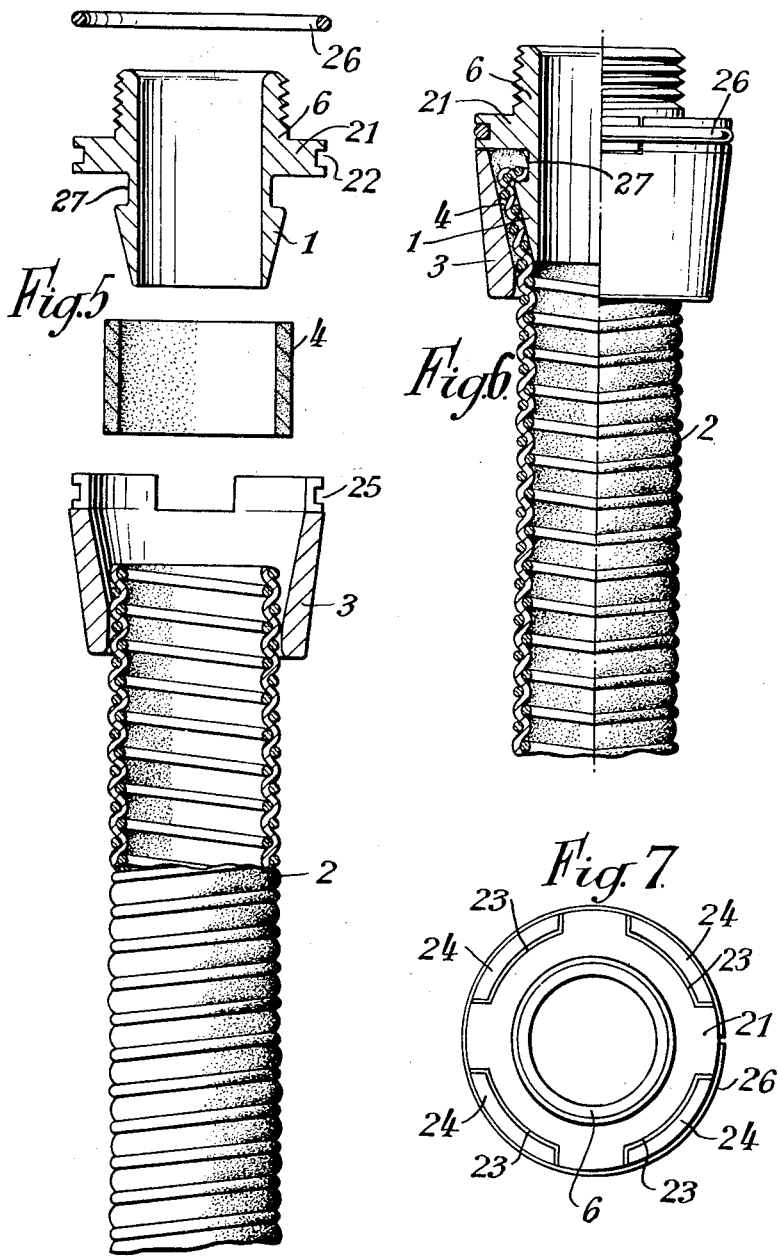

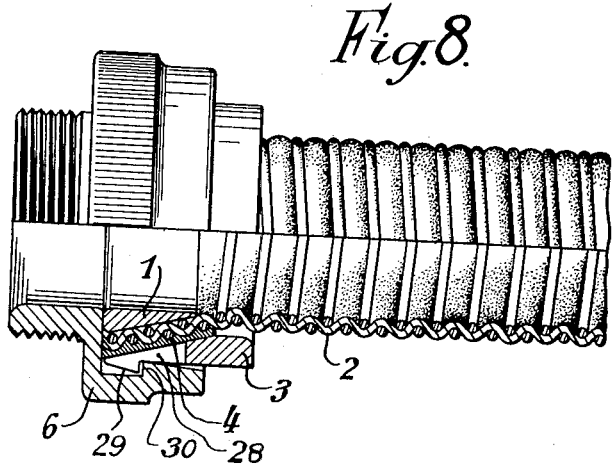
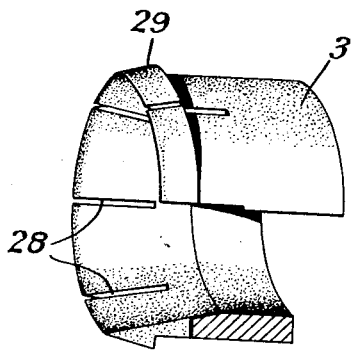

3,156,491
END FITTINGS FOR FLEXIBLE HOSES, CONDUITS OR THE LIKE
Frank Reed Jackson, Burnham, and John William Wilson, Slough, England, assignors to Superflexit Limited, Slough, England
Filed July 17, 1961, Ser. No. 124,466
Claims priority, application Great Britain, Aug. 17, 1960, 28,541/60
3 Claims. (Cl. 285—243)

This invention relates to end fittings for flexible hoses, conduits or the like and particularly electrical conduits intended to enclose a number of individual electrical conductors which are bunched together and usually soldered to a multi-pin plug or other type of electrical connector.

The invention is particularly concerned with conduits which are helically convoluted internally and externally by means of reinforcing wires or the like made from metal or plastic and are composed of a comparatively incompressible material such as polyvinylchloride or polytetrafluorethylene and where it is very desirable to provide a fluid tight seal between the conduit and end fitting.

In some cases it is desirable for the end fitting to be made as short as possible as for instance where two end fittings are carried by a comparatively short length of conduit which necessarily has to be bent to a small radius of curvature.

The chief object of the present invention is to evolve an end fitting of a generally improved compact construction having better sealing properties.

An end fitting in accordance with the present invention includes an externally tapered inner sleeve adapted to enter the belled extremity of the conduit, a grommet composed of rubber or similar resilient and compressible material adapted to surround the extremity of the conduit, an internally tapered compression sleeve adapted to enclose the grommet and a body member or its equivalent having a portion against which the inner sleeve can abut under an axially applied force applied to the opposite end of the compression sleeve to compress the grommet into sealing engagement with the conduit and compression sleeve and to cause the conduit and grommet to be firmly gripped between the tapering faces of the inner faces of the inner sleeve and compression sleeve and means for locking the inner sleeve and compression sleeve against relative movement in the opposite direction.

To ensure that the grommet will be compressed an amount sufficient to ensure a good seal, it is proposed to employ an external force for applying pressure to the inner sleeve and compression sleeve in opposite directions and axially thereof such as for example a specially designed tool.

Referring to the accompanying drawings:
FIGURES 1 and 2 show the invention applied respectively to end fittings of the retractible and non-retractible types;
FIGURES 3 and 4 are an exploded view and half sectional elevation illustrating an alternative construction;
FIGURES 5 and 6 are similar views illustrating a further alternative construction;
FIGURE 7 is a plan view; and
FIGURES 8 and 9 are a fragmentary longitudinal section and a perspective view partly in section illustrating a further modification.

In all the constructions illustrated the end fittings include a parallel bored externally tapered inner sleeve 1 intended to be forced into the end of the plastic conduit 2 the latter being of the kind having internally and externally arranged convolutions, the convolutions being filled with internal and external plastic, metal or other reinforcement, an internally tapered sleeve 3 and a cylindrical rubber or like grommet 4. The inner sleeve 1 is pushed into the previously belled end of the conduit 2, the cylindrical grommet 4 being then expanded over the end of the conduit so that it grips the latter.

The compression sleeve 3 is then forced over the grommet, the conduit and grommet being compressed between the parallel tapering faces of the inner sleeve and compression sleeve.

In FIGURE 1 the extremity of the inner sleeve abuts against a flange 5 on a body member 6 the latter being internally screw threaded to receive a ring nut 7 which abuts against a shoulder 8 on the compression sleeve to force the latter axially into the position shown.

In FIGURE 1 the end fitting includes a retractible outer sleeve 9 making screw threaded connection with the plug or socket connector 10 to which the various electrical conductors 11 are soldered, the sleeve 9 having an internal flange 12. Sealing washers 13 and 14 are interposed between the flanges and the body and a retaining nut 15, the latter screwing onto the threaded extremity of the compression sleeve 6. By removing the nut 15 and washer 14, the outer sleeve 9 can be retracted for access to the soldered connections.

In FIGURE 2 the end fitting does not include a retractible sleeve but includes a cylindrical body 16 which is connected directly with the plug or socket connector 10. The body 16 is threaded to receive a retaining nut 17 which is internally shouldered at 18 to engage the shoulder 8 on the compression sleeve 3. The inner sleeve 1 and also compression sleeve 3 when fully tightened abut against an internal flange 19 on the body 16.

FIGURES 3 and 4 show a construction which is very similar to that shown in FIGURE 1 but in this case the end fitting does not include a retractible sleeve. The body member 6 which receives the ring nut 7 is provided with an externally threaded neck portion 20 for its attachment to a plug or socket connector or other part.

In FIGURES 5, 6 and 7 a totally different type of locking means is provided for maintaining the inner sleeve 1 and compression sleeve 3 in gripping engagement with the grommet 4 and conduit 2.

In this construction the inner sleeve 1 is constructed integrally with an externally screw threaded body member 6 for attachment to a plug or socket connector or other part, body member 6 having a flange 21 formed with a peripheral groove 22 and with four equally spaced recesses 23 adapted to receive four arcuate shaped upstanding projections 24 on the compression sleeve 3. The projections 24 are each formed with a peripheral groove 25 which when the conduit 2 and its associated grommet 4 are sandwiched between the inner sleeve 1 and the compression sleeve 3, the grommet being compressed to the form shown in FIGURE 6, are aligned with groove 22, a circlip 26 being then inserted in grooves 22 and 25 to lock the parts against relative movement in an axial direction as shown clearly in FIGURE 6.

As will be seen clearly in FIGURES 5 and 6 the inner sleeve 1 has a neck portion 27 of reduced diameter which forms a peripheral groove into which the upper edge of the grommet and upper extremity of the conduit are forced under the compressive action of the compression sleeve. The construction shown in FIGURES 5 and 6 has the advantage of providing a positive lock against relative slackening movement of the parts due for example to the fitting being subjected to extreme temperature conditions.

Another way in which a positive lock can be obtained is illustrated by FIGURES 8 and 9. In this case the compression sleeve 3 is formed with a number of radially spaced saw cuts or slits 28 extending from the extremity of the tapered part throughout the greater part of its length, the compression sleeve being formed with an annular barb-like portion 29. The body portion which is externally threaded for attachment to a plug or socket connector or other part has an internal shoulder 30 which the barb portion 29 can override when the assembly is pushed into the body thus locking the compression sleeve 3 to the body 6 and securely holding the conduit in position within the body member. The saw cuts in the tapered part of the compression sleeve render that part of the sleeve sufficiently resilient to permit of a reduction in diameter sufficient to allow the barb portion to be sprung over the shoulder 30 during assembly. Such a construction, like the construction shown in FIGURES 5 and 6 has the advantage that the grip on the grommet and conduit is not likely to slacken as a result of changes in temperature.

We claim:

1. An end fitting for a flexible conduit having a belled extremity, said fitting comprising a cylindrical body member having an end portion with an externally tapered surface adapted to be positioned in the belled extremity of the conduit, a grommet of resilient compressible material adapted to surround the belled extremity of the conduit and in engagement with the outer surface thereof, an internally tapered compression sleeve encompassing the grommet, said body member having an outwardly directed flange defining an abutment shoulder for the grommet and the conduit, means positively to lock the body member and the compression sleeve in position with the conduit and grommet firmly gripped between the tapering faces of the end portion of the body member and the compression sleeve, said means comprising a circlip, engaging registering grooves in said flange and said compression sleeve, said body member having an annular groove therein between the flange thereof and said end portion into which the edge of the grommet and conduit are compressed to provide an efficient seal.

2. An end fitting as claimed in claim 1 in which the flange is recessed at spaced points to receive correspondingly shaped projections on the compression ring, the flange and projections being formed with aligned peripheral grooves for engagement by the circlip to lock the parts against relative axial movement.

3. An end fitting for a flexible conduit having a belled extremity, said fitting comprisng an externally tapered inner sleeve in the belled extremity of the conduit, a grommet of resilient compressible material surrounding the belled extremity of the conduit and in engagement with the outer surface thereof, an internally tapered compressed sleeve encompassing the grommet, a cylindrical body member having an abutting portion reacting against the inner sleeve to compress the grommet into sealing engagement with the conduit and compression sleeve, whereby the conduit and grommet are firmly gripped between the tapering faces of the inner sleeve and compression sleeve, said compression sleeve having a plurality of radially spaced slots extending from the extremity of its tapered part, the extremity of the tapered parts being formed with an annular barb-like projection, said body member having an internal annular shoulder, whereby when the barb-like projection is moved into the body member it will positively interlock with the annular shoulder to lock the conduit in position in the body member.

References Cited in the file of this patent

UNITED STATES PATENTS

| | | |
|---|---|---|
| 2,449,570 | Violette | Sept. 21, 1948 |
| 2,890,900 | Williamson et al. | June 16, 1959 |
| 2,983,779 | Dumire et al. | May 9, 1961 |
| 3,037,069 | Wilson | May 29, 1962 |
| 3,074,045 | Overholser | Jan. 15, 1963 |

FOREIGN PATENTS

| | | |
|---|---|---|
| 219,455 | Australia | Dec. 22, 1958 |
| 222,733 | Australia | July 20, 1959 |
| 460,156 | Great Britain | Jan. 22, 1937 |
| 654,500 | Great Britain | June 20, 1951 |